(12) United States Patent
Herbst

(10) Patent No.: US 7,618,607 B2
(45) Date of Patent: Nov. 17, 2009

(54) $XLI_3N_2$ COMPOUNDS AND THEIR HYDRIDES AS HYDROGEN STORAGE MATERIALS

(75) Inventor: Jan F. Herbst, Grosse Pointe Woods, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 412 days.

(21) Appl. No.: 11/386,409

(22) Filed: Mar. 22, 2006

(65) Prior Publication Data

US 2007/0224102 A1  Sep. 27, 2007

(51) Int. Cl.
*C01F 17/00* (2006.01)
*C01B 21/092* (2006.01)

(52) U.S. Cl. ..................... 423/263; 423/413

(58) Field of Classification Search ........... 423/351, 423/413, 263
See application file for complete search history.

(56) References Cited

U.S. PATENT DOCUMENTS 6,946,112 B2 * 9/2005 Chen et al. .............. 423/645

OTHER PUBLICATIONS

Chen et al., "Hydrogen Storage in Metal-N-H Complexes," 2005, NUS, pp. 1-30.*
Rainer Niewa, et al.; Li3[ScN2]; The First Nitridoscandate(III)-Tetrahedral Sc Coordination and Unusual MX2 Framework; Chem. Eur. J. 2003, 4255-4259; 2003 Wiley-VCH Verlag Gmb.
A. Gudat, R. Kniep and A. Rabenau, Li3FeN2, A Ternary Nitride With . . . , Journal of the Less-Common Metals, 161 (1990) 31-36.

* cited by examiner

*Primary Examiner*—Wayne Langel
*Assistant Examiner*—Brittany M Martinez
(74) *Attorney, Agent, or Firm*—Reising Ethington P.C.

(57) ABSTRACT

State-of-the-art electronic structure calculations provide the likelihood of the availability of $ScLi_3N_2$, $TiLi_3N_2$, $VLi_3N_2$, $CrLi_3N_2$, $MnLi_3N_2$, $CoLi_3N_2$, $NiLi_3N_2$, $CuLi_3N_2$, and $ZnLi_3N_2$ as compounds for reaction with hydrogen under suitable conditions. Reaction with hydrogen is likely to form stable hydrides of the family $ScLi_3N_2H_n$, $TiLi_3N_2H_n$, $VLi_3N_2H_n$, $CrLi_3N_2H_n$, $MnLi_3N_2H_n$, $FeLi_3N_2H_n$, $CoLi_3N_2H_n$, $NiLi_3N_2H_n$, $CuLi_3N_2H_n$, and $ZnLi_3N_2H_n$, where n is an integer in the range of 1-4. These materials offer utility for hydrogen storage systems.

2 Claims, 1 Drawing Sheet

- Nitrogen
- Iron
- Lithium

- Nitrogen
- Iron
- Lithium
- Hydrogen

XLI$_3$N$_2$ COMPOUNDS AND THEIR HYDRIDES AS HYDROGEN STORAGE MATERIALS

TECHNICAL FIELD

This invention pertains to compounds useful for solid-state storage of hydrogen. More specifically, this invention pertains to a family of new compounds, XLi$_3$N$_2$, which form hydrides, XLi$_3$N$_2$H$_n$, where X is a 3d transition metal.

BACKGROUND OF THE INVENTION

Considerable development effort is currently being expended on the development of hydrogen and oxygen consuming fuel cells, and there is also interest in hydrogen burning engines. Such power systems require means for storage of hydrogen fuel which hold hydrogen in a safe form at ambient conditions and which are capable of quickly receiving and releasing hydrogen. In the case of automotive vehicles, fuel storage is required to be on-board the vehicle, and storage of hydrogen gas at high pressure is generally not acceptable for such applications.

These requirements have led to the study and development of solid-state compounds for temporary storage of hydrogen, often as hydrides. For example, sodium alanate, NaAlH$_4$, can be heated to release hydrogen gas, and a mixture of lithium amide, LiNH$_2$, and lithium hydride, LiH, can be heated and reacted with the same effect. Despite such progress, however, no known solid-state system currently satisfies targets for on-board vehicular hydrogen storage.

SUMMARY OF THE INVENTION

FeLi3N2 is prepared by reaction of Li$_3$N melt with elemental iron in a nitrogen atmosphere. It crystallizes in the body-centered Ibam structure (space group 72). Other ternary nitride compounds, having the same stoichiometry as FeLi$_3$N$_2$, are of interest as hydrogen storage materials where the ternary nitride takes up hydrogen as XLi$_3$N$_2$H$_n$.

State-of-the-art computational electronic structure methods, using FeLi$_3$N$_2$ as the template compound, indicate that these ternary nitrides, XLi$_3$N$_2$, are thermodynamically stable. Accordingly, this invention demonstrates the credible likelihood that each of ScLi$_3$N$_2$, TiLi$_3$N$_2$, VLi$_3$N$_2$, CrLi$_3$N$_2$, MnLi$_3$N$_2$, CoLi$_3$N$_2$, NiLi$_3$N$_2$, CuLi$_3$N$_2$, and ZnLi$_3$N$_2$ can be prepared as new materials for storage of hydrogen. The computational methods also show thermodynamic stability of the hydrides ScLi$_3$N$_2$H$_n$, TiLi$_3$N$_2$H$_n$, VLi$_3$N$_2$H$_n$, CrLi$_3$N$_2$H$_n$, MnLi$_3$N$_2$H$_n$, FeLi$_3$N$_2$H$_n$, CoLi$_3$N$_2$H$_n$, NiLi$_3$NH$_n$, CuLi$_3$N$_2$H$_n$, and ZnLi$_3$N$_2$H$_n$. Accordingly, this invention also provides the likelihood of a hydrogen storage compound for each of the specified ternary nitride compositional formulas.

DESCRIPTION OF PREFERRED EMBODIMENTS

State-of-the-art computational electronic structure methods implementing density functional theory (DFT) have been employed with substantial success to model hydride properties, including the crucial enthalpies of formation. That success encourages the development of strategies for harnessing the calculational tools to guide the discovery of novel hydrides. The approach in this case is to choose a compound having a known crystal structure and calculate enthalpies of formation for isostructural, hypothetical compounds constructed by elemental replacements and the addition of hydrogen to the original lattice.

In this work FeLi$_3$N$_2$ is selected as the template compound, and the formation of isostructural XLi$_3$N$_2$ phases and their XLi$_3$N$_2$H$_n$ hydrides with X any of the 3d transition elements (Sc—Zn) or boron, aluminum, or gallium is considered. Searching for hydrides comprising a 3d element such as Ni or Fe to facilitate H$_2$ dissociation and lighter elements such as Li to enhance the gravimetric hydrogen density is the strategy. This strategy is believed to be realistic because two of the most comprehensively investigated hydrides have Ni as a component: LaNi$_5$H$_7$ and Mg$_2$NiH$_4$; the former has excellent H$_2$ sorption characteristics but is only 1.4 mass % H, while the latter requires heating to at least 250° C. for hydrogen liberation. Compounds having the XLi$_3$N$_2$ stoichiometry are only known for X=B, Fe, Al, and Ga, and the only known hydrides are those recently identified in the B—Li—N—H system.

Crystal Structure of FeLi$_3$N$_2$

Figure 1:
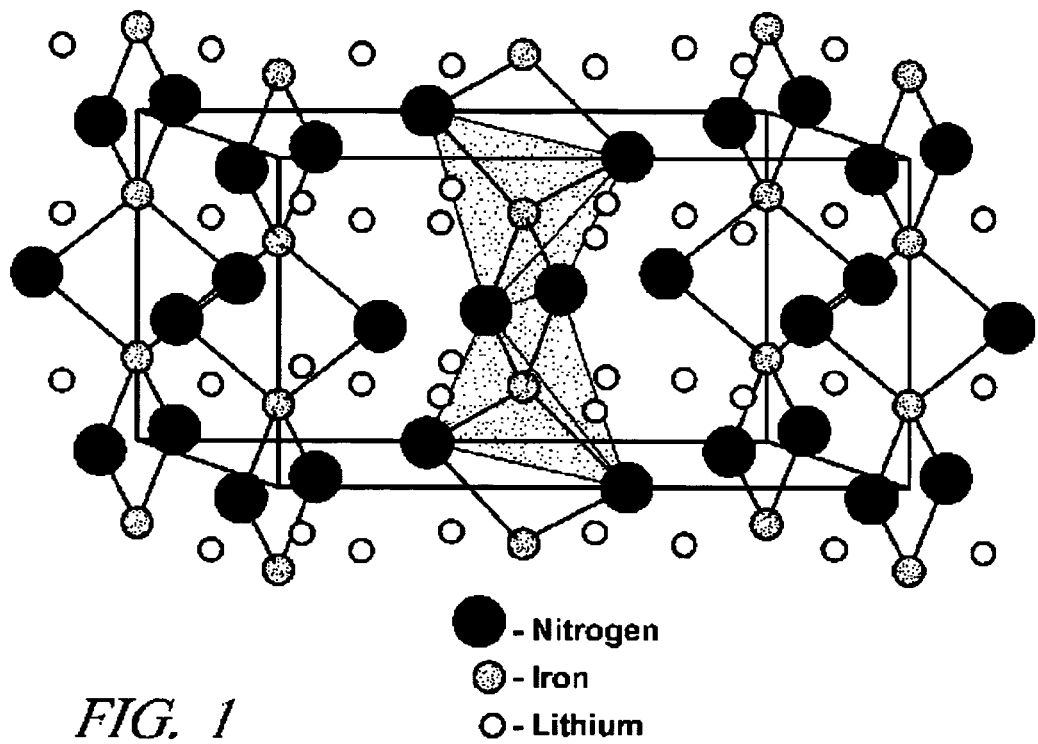
FIG. 1 illustrates the experimentally determined structure of FeLi$_3$N$_2$ that is the template for computational electronic structure methods showing the thermodynamic stability of other isostructural ternary nitride compounds, XLi$_3$N$_2$. In this figure, the large dark-filled circles represent the positions of nitrogen atoms, the speckled circles represent the positions of iron atoms, and the small unfilled circles represent positions of lithium atoms.
Figure 2:
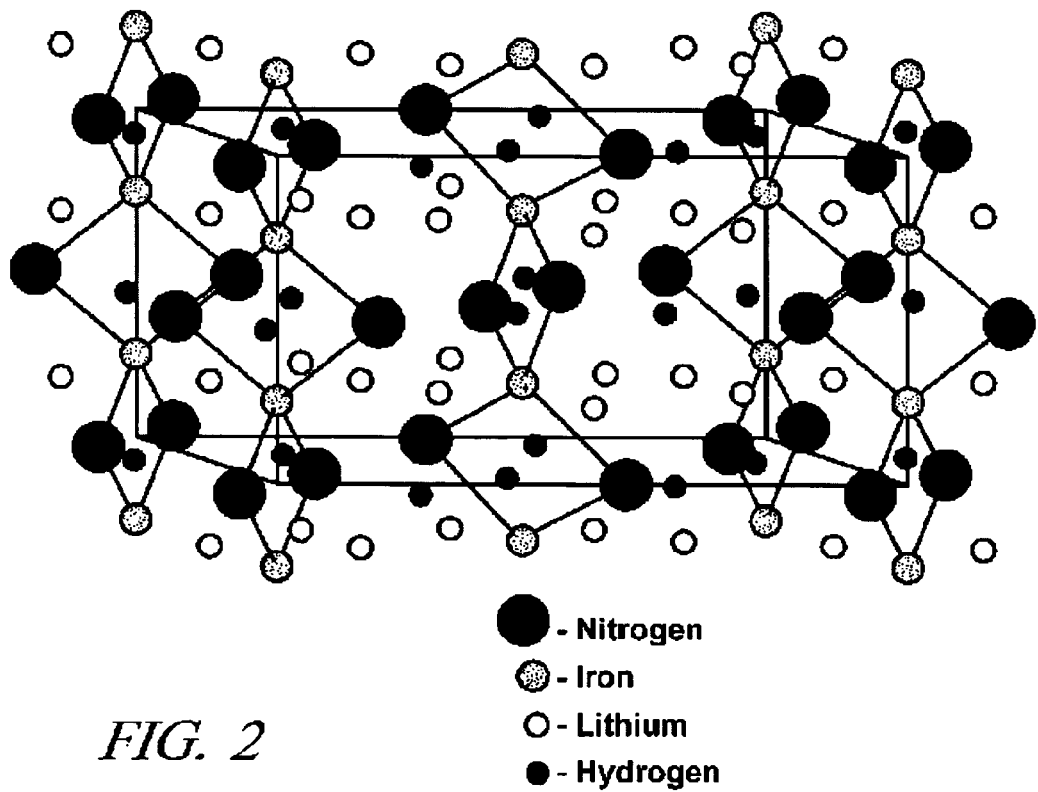
FIG. 2 illustrates the calculated structure of FeLi$_3$N$_2$H$_2$ with H atoms occupying the 8j sites in the Ibam structure; it is the most thermodynamically stable hydride of FeLi$_3$N$_2$ identified with the computational methodology used here. In this figure, the large dark filled circles represent the positions of nitrogen atoms, the speckled circles represent the positions of iron atoms, the small unfilled circles represent positions of lithium atoms, and the small dark filled circles represent positions of hydrogen atoms.

FeLi$_3$N$_2$ crystallizes in the body-centered orthorhombic Ibam structure (space group No. 72). The conventional unit cell, illustrated in FIG. 1, contains four FeLi$_3$N$_2$ formula units (f.u.). The space group allows eleven distinct crystallographic sites; the 4a, 4b, 4c, 4d, and 8e positions are fixed by symmetry, while the 8f, 8g, 8h, 8i, 8j, and 16k sites have variable coordinates and thus can be multiply occupied. In FeLi$_3$N$_2$, iron and nitrogen ions occupy the 4a and 8j sites, respectively, and the lithium ions fill the 4b and 8g sites. FeLi$_3$N$_2$ contains infinite chains of edge-sharing FeN$_4$ tetrahedra along the c-direction. These chains are isoelectronic to the SiS$_2$ one-dimensional macromolecule and form nearly hexagonal arrays linked by sharing common edges with LiN$_4$ tetrahedra. Two of these tetrahedra are highlighted with speckling in FIG. 1.

Calculation Procedures

Electronic total energies E were computed for the primitive cells (containing two formula units, f.u.) with the Vienna ab initio simulation package (VASP), which implements DFT using a plane wave basis set. Projector-augmented wave potentials were employed for the elemental constituents, and a generalized gradient approximation (GGA) was used for the exchange-correlation energy functional $\mu_{xc}$. Paramagnetic calculations were performed for all materials except those containing Fe, Co, and Ni, for which spin-polarized calculations were done to assess the possibility of magnetic states. An interpolation formula was used for the correlation component of $\mu_{xc}$ in the spin-polarized cases. For all the XLi$_3$ $N_2$ and $XLi_3N_2H$, compounds a plane wave cutoff energy of 900 eV was imposed and (6 6 6) Monkhorst-type k-point grids having 45 points in the irreducible Brillouin zone were employed. In each case at least two simultaneous relaxations of the lattice constants and nuclear coordinates not fixed by the space group were carried out. The electronic total energies and forces were converged to $10^{-6}$ eV/cell and $10^{-4}$ eV/Å, respectively. Calculations for the $H_2$, $N_2$ molecules and the elemental metals Li, X were performed with the same computational machinery to the same levels of precision.

Enthalpies of formation, $\Delta H$, were obtained from total energy differences:

$$\Delta H(XLi_3N_2) = E(XLi_3N_2) - E(X) - 3E(Li) - E(N_2) \quad (1)$$

for the parent compounds, and $$\Delta H(XLi_3N_2H_n) = (2/n)\ [E(XLi_3N_2H_n) - E(X) - 3E(Li) - E(N_2) - (n/2)E(H_2)] \quad (2)$$

for the hydrides, where n is the number of H atoms in a given configuration. Each $\Delta H$, specified per $XLi_3N_2$ formula unit (f.u.) in equation (1) and per $H_2$ molecule in equation (2), is the standard enthalpy of formation at zero temperature in the absence of zero point energy contributions. A negative $\Delta H$ indicates stability of the material relative to its elemental solid and molecular constituents.

Results of Calculations $XLi_3N_2$ Parent Compounds

Table I lists $\Delta H(XLi_3N_2)$ calculated according to equation (1) for the 3d transition elements X=Sc, Ti, V, Cr, Mn, Fe, Co, Ni, Cu, Zn, as well as for X=B, Al, and Ga. The compounds are in the Ibam structure of $FeLi_3N_2$. All $\Delta H$ values are in kJ/mole formula unit. Only $FeLi_3N_2$, $BLi_3N_2$, $AlLi_3N_2$, and $GaLi_3N_2$ are known to exist.

TABLE 1

| Compound | $\Delta H(XLi_3N_2)$ (kJ/mole f.u.) |
|---|---|
| $ScLi_3N_2$ | −458 |
| $TiLi_3N_2$ | −446 |
| $VLi_3N_2$ | −384 |
| $CrLi_3N_2$ | −333 |
| $MnLi_3N_2$ | −295 |
| $FeLi_3N_2$ | −246 |
| $CoLi_3N_2$ | −184 |
| $NiLi_3N_2$ | −119 |
| $CuLi_3N_2$ | −28 |
| $ZnLi_3N_2$ | −117 |
| $BLi_3N_2$ | −379 |
| $AlLi_3N_2$ | −482 |
| $GaLi_3N_2$ | −285 |

In each case $\Delta H<0$, suggesting that all the compounds may form. This is certainly correct for $FeLi_3N_2$, the prototype. Encouragingly, it is also true for $BLi_3N_2$, $AlLi_3N_2$, and $GaLi_3N_2$. $BLi_3N_2$ forms in at least three structures all distinct from Ibam: (i) a tetragonal $P4_22_12$ low-temperature phase, (ii) a monoclinic $P2_1/c$ phase often observed at high temperatures, and (iii) a body-centered tetragonal $I4_1/amd$ phase only recently established. $AlLi_3N_2$ and $GaLi_3N_2$ are known to form in the body-centered cubic $Ia3$ structure. All the other compounds in Table I are unknown. Although the results in the table indicate compound existence, the $BLi_3N_2$, $AlLi_3N_2$, and $GaLi_3N_2$ examples emphasize the very likely possibility that the actual $XLi_3N_2$ crystal structure for X other than Fe could well differ from the Ibam $FeLi_3N_2$ template on which the calculations are based. Furthermore, $\Delta H$ in Table I sets an upper bound on the actual $\Delta H$. If an $XLi_3N_2$ compound exists and its structure differs from that of $FeLi_3N_2$, then its $\Delta H$ will be more negative than the value in Table I. $BLi_3N_2$ also illustrates this point. The enthalpies of formation of the three known structures, also calculated via Eq. (1), are all ~−500 kJ/f.u., substantially lower than $\Delta H$=−379 kJ/f.u. in Table I for $BLi_3N_2$ in the Ibam structure.

Plots of the electronic density of states (DoS) were calculated for each $XLi_3N_2$ compound. All the materials in Table I are metals with the exception of $ScLi_3N_2$ and $BLi_3N_2$, which are insulators. Analogous computations for the three known $BLi_3N_2$ phases indicate that all are also insulators with a gap of ~3 eV separating the valence and conduction bands.

$FeLi_3N_2$, $CoLi_3N_2$, and $NiLi_3N_2$ were found to have net magnetic moments of 0.97, 0.17, and 0.19 $\mu_B$/f.u.

$XLi_3N_2H_n$ Hydrides

Since the fixed-coordinate 4a and 4b sites in the Ibam structure are occupied by X and Li, respectively, the 4c, 4d, 8e, 8f, 8g, 8h, 8i, and 16k sites, and combinations of them, are available for occupation by hydrogen. All these sites other than the 4c, 4d, and 8e can be multiply occupied, so that in principle an infinite number of hydrogen configurations are possible. For each element X calculations of $\Delta H(XLi_3N_2H_n)$ as defined by Eq. (2) were performed to assess whether stable [$\Delta H(XLi_3N_2H_n)<0$] hydride configurations exist and to find the most stable configuration, that for which $\Delta H(XLi_3N_2H_n)$ is a minimum. According to the van't Hoff relation $$\ln p/p_0 = \Delta H/RT - \Delta S/R, \quad (3)$$

where $\Delta S$ is the entropy of formation and R the gas constant, the configuration having the most negative $\Delta H$ is that which is stable at the lowest $H_2$ pressure p.

Calculations were carried out for hydrogen occupying each of the possible individual sites and for the 4c4d, 4d8j, $8j_18j_2$, $4d8j_18j_2$, 8j16k, and $16k_116k_2$ combinations. This spectrum of choices was sufficiently comprehensive to ensure that the configuration having the minimum $\Delta H$ was identified for each $XLi_3N_2H_n$. Several negative $\Delta H$ values were found for every X, suggesting the possibility of hydride formation in each case. The most stable hydrogen configuration varies through the $XLi_3N_2H_n$ series. The 4d sites provide the greatest stability for X=Sc, Ti; the $8j_18j_2$ combination for X=V, Cr; the 8j sites for X=Mn, Fe, Co, Ni, Cu; and the 16k sites in the Zn hydride. The most unstable arrangements are those for hydrogen in the 8f, 8g, 8h, and 8i sites. It appears likely that hydrogen filling of these sites destabilizes the interaction between the Li ions on the 4b and 8g sites and the N ions on the 8j sites.

No $XLi_3N_2H_n$ hydrides are known for X=Sc—Zn but, as for the parent compounds, the case of boron provides encouragement that at least some may form. The calculations for $BLi_3N_2H_n$ in the Ibam structure reveal $BLi_3N_2H_4$ with hydrogen occupying $8j_18j_2$ sites as the most stable; each conventional cell contains four $BLi_3N_2H_4$ formula units. This result is in qualitative accord with the fact that $BLi_4N_3H_{10}$ and other B—Li—N—H hydrides have indeed been synthesized.

Table II summarizes the minimum $\Delta H$ results from the calculations and includes the hydrogen mass percentage for each hypothetical hydride. The crystallographic sites occupied by hydrogen are indicated in parentheses in the first column. All $\Delta H$ values in kJ/mole $H_2$. Only B—Li—N—H hydrides are known to exist. If any of these were to form in a different crystal structure or with an alternate stoichiometry the hydrogen content could certainly change. In particular, the 6.3 mass % value for $BLi_3N_2H_4$ in Table II underestimates the 11.1 H mass % for the actual $BLi_4N_3H_{10}$ hydride.

TABLE 2

| $XLi_3N_2$ hydride (H configuration in conventional cell) | $\Delta H(XLi_3N_2)$ (kJ/mole $H_2$) | mass % H |
|---|---|---|
| $ScLi_3N_2H$ (4d) | −439 | 1.1 |
| $TiLi_3N_2H$ (4d) | −331 | 1.0 |
| $VLi_3N_2H_4$ ($8j_1 8j_2$) | −198 | 3.9 |
| $CrLi_3N_2H_4$ ($8j_1 8j_2$) | −155 | 3.8 |
| $MnLi_3N_2H_2$ (8j) | −128 | 1.9 |
| $FeLi_3N_2H_2$ (8j) | −124 | 1.9 |
| $CoLi_3N_2H_2$ (8j) | −144 | 1.8 |
| $NiLi_3N_2H_2$ (8j) | −143 | 1.8 |
| $CuLi_3N_2H_2$ (8j) | −178 | 1.8 |
| $ZnLi_3N_2H_4$ (16k) | −148 | 3.4 |
| $BLi_3N_2H_4$ ($8j_1 8j_2$) | −228 | 6.3 |

To determine the effect of hydriding on the electronic structure the electronic densities of states (DoS) for the hydrides characterized by the minimum ΔH were calculated together with the DoS for the parents. In each case hydrogen-derived bands appear below the bottom of the valence bands of the parent, similar to the behavior of $LaNi_5$ on hydriding. From the DoS at the Fermi energy $\epsilon_F$ it became apparent that the X=Sc, Ti, V, Cr, Fe, Ni, and Zn hydrides are metals. $NiLi_3N_2H_2$ (8j) [occupied hydrogen sites in parentheses] is in fact a half-metal since the majority (↑) spin DoS is zero at $\epsilon_F$ while there is substantial minority (↓) spin DoS at the Fermi level. The X=Mn, Co, Cu, and B hydrides are all insulators (zero DoS and gaps at $\epsilon_F$).

Most of the $XLi_3N_2$ parents are metals and remain metallic on hydrogen uptake, and $BLi_3N_2$ and its $BLi_3N_2H_4$ ($8j_1 8j_2$) hydride are both insulators. The X=Sc, Mn, Co, Cu, and Ni materials, however, feature three types of intriguing electronic transitions on hydriding to the minimum ΔH configuration. First, $ScLi_3N_2$ is an insulator, but its $ScLi_3N_2H$ (4d) hydride is a metal. Second, $MnLi_3N_2$, $CoLi_3N_2$, and $CuLi_3N_2$ are metals, while their corresponding $MnLi_3N_2H_2$ (8j), $CoLi_3N_2H_2$ (8j), and $CuLi_3N_2H_2$ (8j) hydrides are insulators. Third, $NiLi_3N_2$ is metallic in both spin bands, but its $NiLi_3N_2H_2$ (8j) hydride is predicted to be a half-metal. Were these materials to form, such transitions might serve as the bases for hydrogen sensor applications.

These state-of-the-art electronic structure calculations demonstrate the credible likelihood of the availability of $ScLi_3N_2$, $TiLi_3N_2$, $VLi_3N_2$, $CrLi_3N_2$, $MnLi_3N_2$, $CoLi_3N_2$, $NiLi_3N_2$, $CuLi_3N_2$, and $ZnLi_3N_2$ as compounds for reaction with hydrogen under suitable conditions. Reaction with hydrogen should form stable hydrides of the family $ScLi_3N_2H_n$, $TiLi_3N_2H_n$, $VLi_3N_2H_n$, $CrLi_3N_2H_n$, $MnLi_3N_2H_n$, $CoLi_3N_2H_n$, $NiLi_3N_2H_n$, $CuLi_3N_2H_n$, and $ZnLi_3N_2H_n$, where n is an integer in the range of 1-4.

The above-described synthesis of $FeLi_3N_2$, adapted for the properties of the specific other elements of the 3d transition metal group, provides a basis for the synthesis of the parent compounds.

The invention claimed is:

1. Any one or more of the hydrides of ternary nitrides of the compositional formulas selected from the group consisting of $ScLi_3N_2H_n$, $TiLi_3N_2H_n$, $VLi_3N_2H_n$, $CrLi_3N_2H_n$, $MnLi_3N_2H_n$, $FeLi_3N_2H_n$, $CoLi_3N_2H_n$, $NiLi_3N_2H_n$, $CuLi_3N_2H_n$, and $ZnLi_3N_2H_n$, where n is an integer having a value of from 1 to 4.

2. Any one or more of the hydrides of ternary nitrides as recited in claim 1 of the compositional formulas selected from the group consisting of $ScLi_3N_2H$, $TiLi_3N_2H$, $VLi_3N_2H_4$, $CrLi_3N_2H_4$, $MnLi_3N_2H_2$, $FeLi_3N_2H_2$, $CoLi_3N_2H_2$, $NiLi_3N_2H_2$, $CuLi_3N_2H_2$, and $ZnLi_3N_2H_4$.

* * * * *